(12) United States Patent
Mueller

(10) Patent No.: US 10,203,072 B2
(45) Date of Patent: Feb. 12, 2019

(54) LIGHT MODULE FOR PROVIDING LIGHT

(71) Applicant: OSRAM GmbH, Munich (DE)

(72) Inventor: Juergen Mueller, Berlin (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 15/669,999

(22) Filed: Aug. 7, 2017

(65) Prior Publication Data

US 2018/0038559 A1    Feb. 8, 2018

(30) Foreign Application Priority Data

Aug. 8, 2016  (DE) ................. 10 2016 214 637

(51) Int. Cl.
| | |
|---|---|
| *F21K 9/64* | (2016.01) |
| *G02B 26/00* | (2006.01) |
| *G02B 27/30* | (2006.01) |
| *F21Y 115/30* | (2016.01) |
| *F21V 9/32* | (2018.01) |

(52) U.S. Cl.
CPC .............. *F21K 9/64* (2016.08); *G02B 26/008* (2013.01); *G02B 27/30* (2013.01); *F21V 9/32* (2018.02); *F21Y 2115/30* (2016.08)

(58) Field of Classification Search
CPC ......... F21K 9/64; G02B 26/008; G02B 27/30; F21Y 2115/30; F21V 9/32
USPC .......................................................... 362/84
See application file for complete search history.

(56) References Cited

U.S. PATENT DOCUMENTS

| 9,223,196 | B2 | 12/2015 | Mehl | |
|---|---|---|---|---|
| 9,942,528 | B2 * | 4/2018 | Akiyama | ............. H04N 9/3114 |
| 2009/0187234 | A1 | 7/2009 | Meyer et al. | |
| 2010/0315604 | A1 * | 12/2010 | Peeters | ................ G02B 26/008 |
| | | | | 353/84 |
| 2011/0116253 | A1 * | 5/2011 | Sugiyama | ............. F21S 10/007 |
| | | | | 362/84 |
| 2012/0106126 | A1 * | 5/2012 | Nojima | ................ G02B 26/008 |
| | | | | 362/84 |

(Continued)

FOREIGN PATENT DOCUMENTS

| DE | 102013203572 A1 | 9/2014 |
|---|---|---|
| DE | 102014221115 A1 | 4/2016 |

OTHER PUBLICATIONS

German Search Report based on application No. 10 2016 214 637.8 (8 pages) dated Mar. 7, 2017 (Reference Purpose Only).

*Primary Examiner* — Claude J Brown
(74) *Attorney, Agent, or Firm* — Viering Jentschura & Partner mbB

(57) ABSTRACT

A light module for providing light includes an excitation radiation source which is adapted to emit excitation radiation, at least one first phosphor which is adapted to at least partially convert the incident excitation radiation into conversion light and to generate with this conversion light a first light path, and a phosphor apparatus having a segmentation which has at least two different types of segments, with the segments of the first type comprising the first phosphor. The light module is designed for a periodic movement between an excitation beam that is coming from the excitation radiation source and is incident on the phosphor apparatus and the segmentation, in which there is at least one phase per period in which more than two segments are at least partially irradiated simultaneously by the excitation radiation.

16 Claims, 11 Drawing Sheets

(56) References Cited

U.S. PATENT DOCUMENTS

| | | | |
|---|---|---|---|
| 2013/0075633 A1* | 3/2013 | Hu | H05B 33/0842 250/552 |
| 2013/0107221 A1* | 5/2013 | Hsu | G03B 21/204 353/31 |
| 2013/0271954 A1* | 10/2013 | Li | F21V 9/40 362/84 |
| 2014/0140038 A1* | 5/2014 | Gerets | G03B 21/16 362/84 |
| 2015/0062908 A1* | 3/2015 | Choi | G03B 21/2013 362/293 |
| 2015/0124429 A1* | 5/2015 | Hoehmann | F21V 9/40 362/84 |
| 2018/0033357 A1* | 2/2018 | Li | G09G 3/007 |

\* cited by examiner

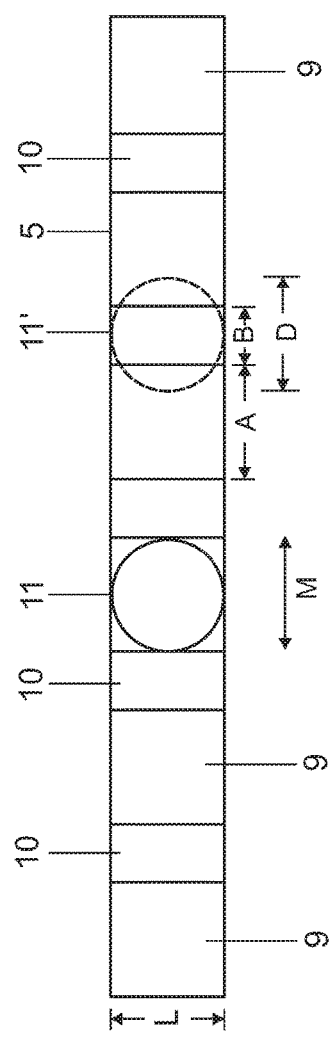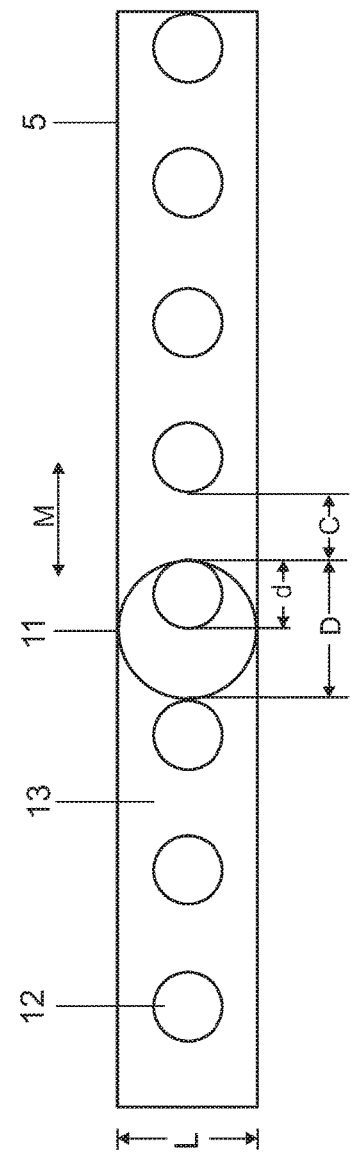

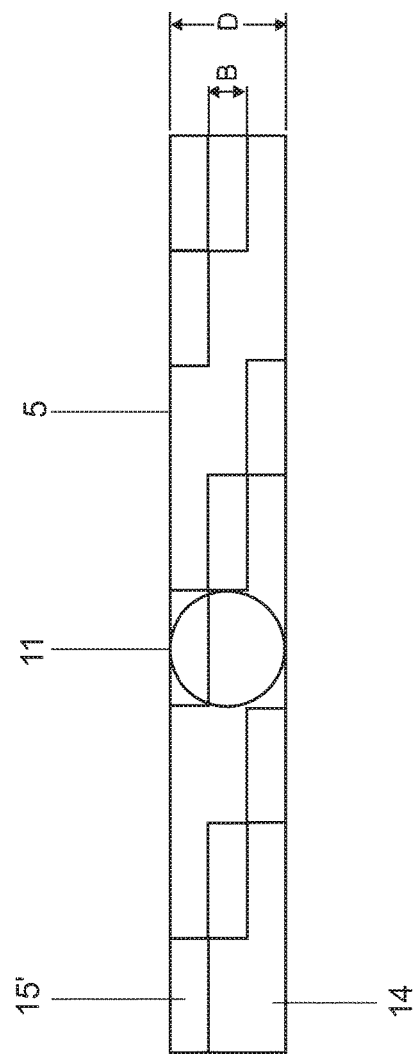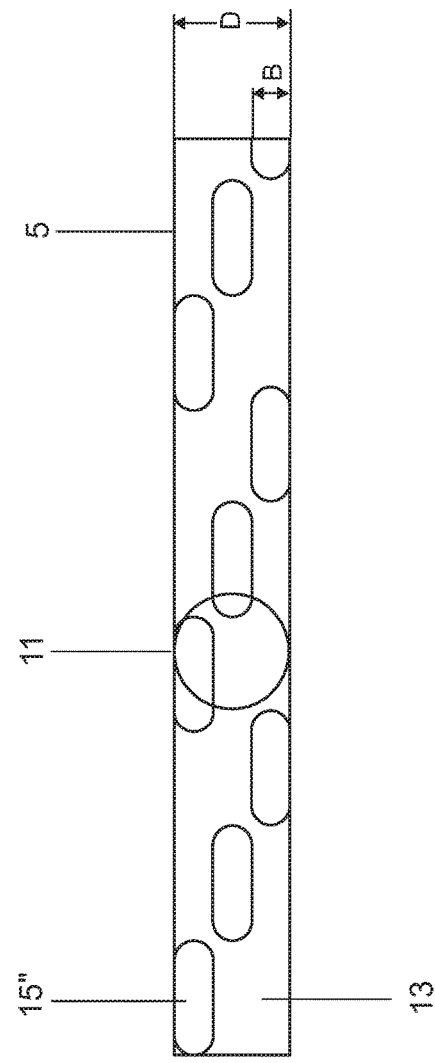

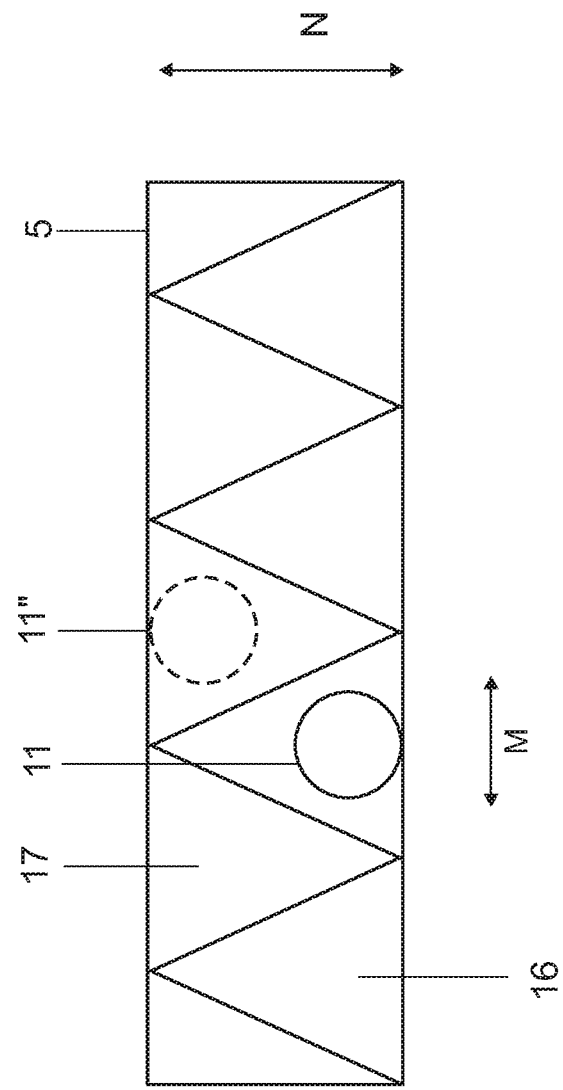

LIGHT MODULE FOR PROVIDING LIGHT

CROSS-REFERENCE TO RELATED APPLICATION

This application claims priority to German Patent Application Serial No. 10 2016 214 637.8, which was filed Aug. 8, 2016, and is incorporated herein by reference in its entirety.

TECHNICAL FIELD

Various embodiments relate generally to a light module for providing light for an illumination apparatus. More specifically, various embodiments relate to a light module having an excitation light source and a wavelength conversion array. The excitation light source emits excitation light that is converted, using the wavelength conversion array, into light in a spectral range that differs from the excitation light (conversion light). The wavelength conversion array typically includes one or more phosphors suitable for wavelength conversion.

Various embodiments relate to the use of high-power white-light sources for endoscopy, microscopy or for medical examination lamps and for entertainment applications, for example the implementation of what are known as light fingers (Sky Tracker), spotlights (follow spots), stationary and moving effect lights (moving lights, wash lights) etc. Various embodiments can also be used for 1-chip or 3-chip projection applications (LCD, DLP, LCoS).

BACKGROUND

Illumination apparatuses with light modules that have a wavelength conversion element in the form of a phosphor are known from the prior art.

LARP (laser activated remote phosphor) light sources, as they are referred to, have been known for a good while for video projection, and are based on the conversion of blue laser light into white useful light using phosphor converters. Depending on the application, white light is generated sequentially as a sequence of red, green and blue light using a dynamic or periodically moving LARP arrangement or is generated continuously by superposing blue and yellow light using a static or not periodically moving LARP arrangement.

In applications with great light demands, dynamic LARP arrangements with phosphor wheels are typically used, in which a more uniform distribution of the energy introduction takes place due to the rotational movement about the wheel axis. Rather than concentrating the entire excitation energy onto a single phosphor spot, as in static LARP arrangements, distribution is here effected over an extensive phosphor track. The rotation additionally facilitates the heat exchange with the ambient air.

For dynamic LARP arrangements, not just rotating phosphor apparatuses are known, but alternatively also linearly periodically moving or translationally oscillating phosphor apparatuses. A disadvantage here is that in the two turning points, a locally longer excitation duration occurs, among other things in connection with a typical increase in phosphor damage.

In static LARP arrangements, white light is frequently generated by only partially converting incident blue excitation light into yellow light, as a result of which the non-converted blue residual light that is scattered in the yellow phosphor can be superposed with the yellow conversion light to form white useful light. The LARP arrangements can here be designed both in reflection and transmission mode. In the reflection mode, blue, non-converted residual light and yellow conversion light are reflected by the phosphor apparatus, but is transmitted by it in the transmission mode. The advantage of this partial conversion method is in any case a continuous white light generation. The disadvantage, however, is that the color point of the white useful light is able to be set only with difficulty, because the ratio of the two color light components, blue and yellow, strongly depends on fluctuations in the manufacturing of the yellow phosphor layer (layer thickness variation, grain size distribution of the phosphor particles, density fluctuations of the phosphor particles in the surrounding matrix etc.). In addition, the blue/yellow ratio is fixedly specified and cannot be altered independently of one another.

On the other hand, full conversion is subject to far lower fluctuations, since here the radiated blue light is converted completely into yellow light by a suitable yellow phosphor. The white point of the resulting useful light can in this case be set relatively simply by adding purely blue light, e.g. from an additional blue LED or a blue laser diode.

Known in the prior art are phosphor wheels, in which white light is produced using full conversion from a change between yellow and blue light radiation components. Circular ring-shaped segments that convert excitation light or do not convert excitation light are provided herefor on the phosphor wheel. The problems with this type of sequential white-light generation are artefacts such as e.g. what is known as a color break, i.e. decomposition into the spectral components, from which the mixed light is composed, in a way that is visible to the human eye. This effect is especially great if the light generation is superposed by additional movements, such as is typical e.g. in the area of entertainment or effect lighting (e.g. Moving Heads, Sky Tracker). Previous attempts to solve this have sought to reduce the visibility of the color break by increasing the frequency of the change between the two color components (e.g. DE 102014221115 A1).

SUMMARY

A light module for providing light includes an excitation radiation source which is adapted to emit excitation radiation, at least one first phosphor which is adapted to at least partially convert the incident excitation radiation into conversion light and to generate with this conversion light a first light path, and a phosphor apparatus having a segmentation which has at least two different types of segments, with the segments of the first type comprising the first phosphor. The light module is designed for a periodic movement between an excitation beam that is coming from the excitation radiation source and is incident on the phosphor apparatus and the segmentation, in which there is at least one phase per period in which more than two segments are at least partially irradiated simultaneously by the excitation radiation.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 2A shows an embodiment of the phosphor carrier shown in FIG. 1;

FIG. 2B shows a variant of the embodiment of the phosphor carrier shown in FIG. 2A;

FIG. 2D shows a discretized variant of the embodiment of the phosphor carrier shown in FIG. 2C;

FIG. 2E shows a further discretized variant of the embodiment of the phosphor carrier shown in FIG. 2C;

FIG. 3 shows a further embodiment of the phosphor carrier shown in FIG. 1;

DESCRIPTION

Figure 1:
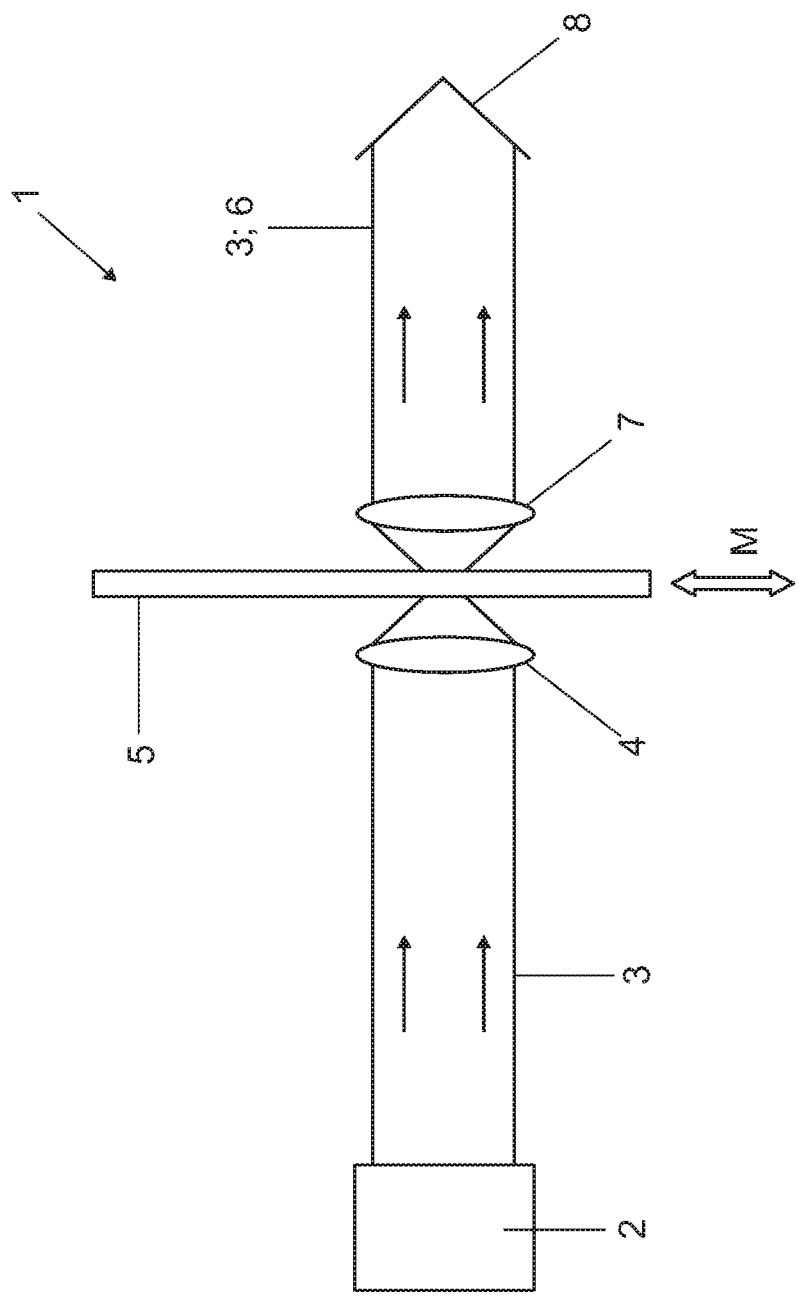
FIG. 1 shows an embodiment of a light module for the transmission operation.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments specify a light module for providing light, in which the color break phenomenon is at least reduced or even nearly completely suppressed.

Various embodiments provide white light having a high spatial and/or time-averaged spectral homogeneity, i.e. at most with a slight variation in the color point, which is averaged over a time interval or over an oscillation interval, of the useful light generated by mixing light of different colors.

Various embodiments provide a light module for providing light, including an excitation radiation source which is adapted to emit excitation radiation, at least one first phosphor which is adapted to at least partially convert the incident excitation radiation into conversion light and to generate with this conversion light a first light path, a phosphor apparatus having a segmentation which has at least two different types of segments, with the segments of a first type including the first phosphor, wherein the light module is designed for a periodic movement between an excitation beam that is coming from the excitation radiation source and is incident on the phosphor apparatus and the segmentation, in which there is at least one phase per period in which more than two segments are at least partially irradiated simultaneously by the excitation radiation.

In addition, protection is sought for a method for operating the light module according to various embodiments.

Various configurations can be gathered from the respectively dependent claims.

Further configurations are specified in the description below, wherein the individual features can also be essential to the invention in different combinations, and the description always implicitly relates to both the light module and to a method for operating this light module.

Excitation radiation within the meaning of this disclosure is initially understood to mean electromagnetic radiation that can be emitted, for example, by a laser and is not limited with respect to its wavelength to the visible range, but for example also can be in the ultraviolet or infrared ranges. However, LED or laser radiation in the blue spectral range is provided, since it cannot only be used for exciting phosphors, but also as a blue light channel.

The term "excitation radiation source" used within the meaning of this disclosure generally does not exclude the presence of one or more further excitation radiation sources, which for example complement one another spatially, spectrally and/or over time, i.e. can illuminate the phosphor apparatus at the same time or in alternation.

The light module according to various embodiments is based on the finding that the abovementioned problem of the conventional light modules can be solved by way of a suitable geometric configuration and arrangements of the segments of a phosphor arrangement that are responsible for the different color light components. The aim of this measure is not to cause a relatively abrupt change in the irradiation from one segment to the next and so on, but a gradual transition between at least some of the different segments. In addition, it is not only the temporal but also the spatial spectral homogeneity of the useful light radiation that is improved according to various embodiments by a recurring temporal and spatial mixing of different segments within the beam cross section of the excitation radiation. As will be discussed in more detail below, in addition to the configuration and arrangements of the different segments, the size ratios of excitation beam spot to the segments also play a role.

Due to the interaction of all the measures according to various embodiments, what is achieved is that per period of the periodic relative movement of excitation beam and segmentation, there is at least one phase in which more than two segments are at least partially irradiated simultaneously by the excitation radiation, for example excitation laser light.

The light module according to various embodiments may be adapted such that during the at least one phase, at least two of the segments which are at least partially irradiated simultaneously by the excitation radiation belong to the same type of segments. As a result, improved spatial distribution over the cross section of the excitation beam spot is achieved for the color light component that belongs to these two segments of the same type. In other words, instead of splitting the excitation beam cross section relatively roughly only between a segment of one type and a segment of the other type during such a phase, a somewhat finer distribution over at least two spatially separate segments of the same type and at least one segment of the other type is provided. Overall, the color homogeneity over the cross section of the useful light beam is thereby ultimately also improved.

A further improvement of the color homogeneity of the useful light beam can be achieved by configuring the segmentation such that, during one period, there are at least two phases in which the spatial arrangement of the segments which are at least partially irradiated simultaneously by the excitation radiation differs. Consequently, the sequence of the segments within a period is not spatially rigid but varies. As a consequence, a further improvement of the color homogeneity of the useful light beam in the time average is attained.

At least the second type may include segments that transmit or reflect the excitation radiation without conversion. In the simplest case, a transmitting segment can be an opening in the phosphor apparatus, through which the excitation beam can partially pass without obstruction and without wavelength conversion as it travels across it. Alternatively, a material that is transparent for the wavelength of the excitation radiation is also suitable, for example.

A reflecting segment can, in the simplest case, be realized for example by simply locally omitting a phosphor coating on the phosphor apparatus, at least if the carrier material of the phosphor apparatus is sufficiently reflective for the wavelength of the excitation radiation. If appropriate, an additional reflective coating can also be provided.

In addition, the light module is adapted to generate a second light path with the unconverted excitation radiation that is coming from these segments.

The second light path can, in the simplest case, spatially coincide with the first light path. Both light paths differ to this extent in that case only temporarily, i.e. by way of a sequential sequence. The two light paths can, however, also differ spatially. In that case, an optical system may be provided which is adapted to combine the two light paths.

The segmentation may be configured such that it has, within one period, a sequence of as many segments and repetitions of segments of the same type as possible. A suitable number is dependent on the respective application, for example the range of the light beam, the speed of headlight movements etc. The faster the headlight movement is, the smaller or closer together the segments should be. Suitable adaptation can be effected e.g. via the number of segments and/or the frequency of the periodic movement. It is the aim here to achieve within one period the best possible local and temporal mixing of different segments within the excitation beam cross section.

For various embodiments in which at every point during a revolution of a phosphor wheel a good spatial and spectral mixing is to be achieved, it is possible to estimate a number of segments that is typically necessary herefor on the basis of the geometric conditions. Assuming that, for a constantly good mixing, the diameter of the excitation beam spot on the segmentation is of the same size or larger than a dimension of the segments, and the latter are arranged relatively close together in a row along a circular-ring-shaped track near the periphery of the phosphor wheel, a typical number is consequently in the range of approximately 150 to 250 segments or more, with the following typical values being used here: diameter of the excitation beam spot approximately 1 mm, track length on the phosphor wheel in a range of approximately 150 to 250 mm. If at least the radial extent of the segments is sufficiently small for the excitation beam spot to at least partially irradiate more than one concentric track (e.g. two or three or more), then even several hundred segments, for example approximately a thousand, segments are correspondingly provided. An upper limit for the density of the segments which are configured in the form of openings, for example holes, can be assumed to be achieved if the diameter of the openings falls within the order of magnitude of the thickness of the phosphor wheel which is typically configured in the form of a disk, which leads to disturbing effects.

In one embodiment, the segmentation is configured such that the segments of the second type are arranged within one or more segments of the first type, or vice versa. For example, it is possible for at least one of the types to have only one segment and for all segments of the other type or types to be arranged within the one type. For example, a phosphor type can have only one segment, within which all the segments of at least a second type, e.g. a type having reflective and/or transmitting segments and/or segments of a different phosphor type, are arranged.

In order to be able to at least partially irradiate more than two segments at the same time with the excitation beam during a phase, the light module and e.g. the segmentation may be configured such that the diameter of the excitation beam on the segmentation is of the same size or greater than a dimension of the segments of at least one type in the movement direction or perpendicular thereto. On the other hand, in the conventional sequential color light generation, the diameter of the excitation beam is smaller than the extent of the segments transversely to the movement direction. A simultaneous irradiation takes place only for two directly successive segments during the quick change from one segment to the other.

In a more refined and somewhat more complicated variant, the segmentation is configured such that the diameter of the excitation beam on the segmentation is greater than a dimension of the segments of all types both in the movement direction and perpendicular thereto. The result of this is that especially many segments can be, at least partially, irradiated simultaneously during a respective phase.

In a further variant, the light module is adapted such that at no point in time is only one color light component generated, for example only yellow or only blue light, but always, i.e. over the entire period, at least two different color light components are generated simultaneously.

White useful light may be provided for countless applications. For this reason, the light module according to various embodiments is adapted in an embodiment for the generation of white useful light. The white useful light may be generated by mixing yellow and blue light components. The yellow light is generated for example by converting blue excitation light using phosphor conversion. The blue light ("blue light channel") may be formed by the blue excitation light itself. According to various embodiments, one part of the unconverted blue excitation light is brought together simultaneously with one part of the converted yellow light. Due to the improved temporal and e.g. also spatial mixing of the yellow and blue color light components, white useful light with good color homogeneity is generated.

Optionally, the color temperature of the white useful light can be controllable. To this end, for example the excitation beam and the segmentation are configured such that the time-averaged relative color light components and consequently the color point of the resulting white useful light can be changed by way of a relative displacement between excitation beam and segmentation perpendicular to the movement direction of the periodic movement.

In an embodiment, the phosphor apparatus is configured in the form of a phosphor wheel which is adapted for rotation about a rotational axis, and wherein the segmentation is configured in a ring shape or ring-segment shape.

The phosphor wheel is, for example, built up from a carrier material, such as metal or a plastics material, on which the phosphors are applied. With respect to its suitability for rotation, the carrier material may be in the shape of a circular disk and has a rotational axis.

The phosphor wheel can be operated in transmission and/or in reflection. For the operation in transmission mode, e.g. transparent carrier materials, for example glass or sapphire, are suitable for the phosphor wheel. For operation in reflection mode, e.g. reflective metals are suitable as carrier material, for example aluminum. In addition, the thickness of the respective phosphor layer can be adapted accordingly.

The phosphor apparatus can also be implemented in other rotatable forms, for example as a phosphor drum.

Moreover, the phosphor apparatus can also be configured such that it oscillates laterally to the excitation laser beam. However, one disadvantage here is that increased thermal load occurs at the two turning points, which is not the case in a rotary apparatus. However, this problem can be alleviated if the turning points are adapted as purely reflective or transmissive regions.

In a method for operating the light module according to various embodiments, three or more segments are irradiated simultaneously, at least temporarily, at least in partial regions by the excitation radiation. As a result, the spatial color homogeneity over the useful beam cross section is improved during this time phase.

For a color homogeneity which is further improved in the time average, the spatial arrangement and/or type association of the simultaneously irradiated segments is changed in a temporal sequence.

In a development of the method, at no point are only segments of the same type irradiated, but always simultaneously segments of two different types.

FIG. 1 shows a schematic illustration of a light module 1 according to various embodiments for providing white light in transmission operation.

The light module 1 includes an excitation laser 2, which emits blue excitation laser light 3. For the sake of clarity, the excitation laser 2, which is for example assembled from a matrix of laser diodes, and the associated optical elements for beam combination and for beam shaping are not illustrated in detail (however, see FIG. 4). In addition, the optical beam paths are indicated only schematically.

The excitation laser light 3 is selected to be in the blue spectral range (typically 405 to 480 nm), because a suitable excitation wavelength can be found in this spectral range for most phosphors, and suitable semiconductor lasers having the necessary optical beam power, both in terms of the conversion efficiency and of the preferred dominance wavelength of the respectively used phosphor, are also available. In addition, the blue excitation laser light 3 in this embodiment is also used as a blue light channel for the resulting white useful light.

The blue excitation laser light 3 coming from the excitation laser 2 is, as already explained above, collimated using a collimation optical unit, which is not illustrated in FIG. 1 but is subsumed in the symbolic rectangle 2, and guided onto a focusing optical unit 4. The focusing optical unit 4 focuses the blue excitation laser beam 3 onto a phosphor apparatus which is configured in the form of an elongate phosphor carrier 5. A typical diameter of the excitation laser beam spot generated thusly on the phosphor carrier 5 ranges from approximately 1-3 mm. The phosphor carrier 5 transmits the excitation laser light 3 partially as non-converted excitation laser light 3 and partially as wavelength-converted conversion light 6. The transmitted light 3, 6 is collimated after it passes through the phosphor carrier 5, as white useful light 8, by means of a collimation optical unit 7 for further use.

Reference will now be made below to FIGS. 2a to 2e, which each show schematic illustrations of different embodiments of the elongate phosphor carrier 5, specifically the planar front side which is irradiated with the blue excitation laser light 3.

In FIG. 2A, this front side is provided with a first type of rectangular phosphor segments 9, which alternate with likewise rectangular transparent segments 10 of a second type. For the type of the phosphor segments 9, the transparent carrier material of the phosphor carrier 5, consisting e.g. of glass or sapphire, is thinly coated in segment-type fashion with a phosphor (yellow phosphor) which emits in broadband-fashion in the yellow spectral range, e.g. cerium-doped yttrium aluminum garnet. Typical layer thicknesses are here in the range of approximately 100 to 200 µm. For the transparent segments 10 of the second type, in each case an uncoated segment is formed between two phosphor segments 9. In addition, the phosphor carrier 5 is provided with a lateral oscillation apparatus (not illustrated for the sake of clarity), which permits lateral oscillation between the phosphor carrier 5 and the excitation laser beam 3 (in FIG. 1 symbolized by the double-headed arrow M which indicates the oscillation direction of the phosphor carrier 5, wherein the oscillation amplitude can be selected such that the entire phosphor carrier 5 oscillates through the laser beam). As a result, the excitation laser beam spot 11 moves, as it were, to and fro on the front side along the elongate phosphor carrier 5 (likewise symbolized in FIG. 2A by way of the double-headed arrow M). The dimension A of the phosphor segments 9 in the movement direction M is in this example such that it corresponds approximately to the diameter D of the excitation laser beam spot 11. The diameter D is here ascertained, as is customary, as an FWHM (full width at half maximum) value, but can also be defined as the diameter at $1/e^2$ or $1/e$ of the central intensity (e=Euler's number). As a result, for each phosphor segment 9 there is only a short period of time in which the excitation laser beam spot 11 irradiates exactly only one respective phosphor segment 9 (see FIG. 2A). At other times, the excitation laser beam spot 11 always additionally at least partially irradiates at least one transparent segment 10. Since the dimension B of the transparent segments 10 in the movement direction M is in addition smaller than the diameter D of the excitation laser beam spot 11 (B<D), there is in each case between two successive phosphor segments 9 one phase during which three segments are at least partially irradiated simultaneously, specifically one transparent segment 10 and, to the left and right thereof, parts of the two respectively neighboring phosphor segments 9 (illustrated by way of example in FIG. 2A by the dotted excitation laser beam spot 11'). During an oscillation period, there are 2 times 5, i.e. 10, phases in the example illustrated in FIG. 2A during which three segments are at least partially irradiated simultaneously. Here, in each case a narrower transparent segment 10 migrates, as it were, through the excitation laser beam spot 11, led and followed by one phosphor segment 9 in each case. As a result, improved color homogeneity is achieved, both spatially with respect to the cross section of the excitation laser beam spot 11 and in the time average of the periodic oscillation, than compared to a case, as in the prior art, where the dimensions of all segments in the movement direction M are greater than the cross section of the excitation laser beam spot, i.e. the phases of the irradiation of only one segment are at least partially irradiated for a correspondingly longer period of time and additionally never more than two segments simultaneously. In a further embodiment (not illustrated), the transparent segments 10 can deviate from the strict rectangular shape and be configured for example in a frustoconical shape or a trapezoidal shape or in freeform.

The embodiment of the phosphor carrier 5 illustrated in FIG. 2B changes the concept illustrated in FIG. 2A in as far as the second type contains, instead of a multiplicity of a narrower rectangular transparent segment, a multiplicity of a circular transparent segment 12. Here, the respective diameter d of the circular transparent segments 12 is smaller than the diameter D of the excitation laser beam spot 11 (d<D). In addition, the distance C of neighboring transparent segments 12 is likewise smaller than the diameter D of the excitation laser beam spot 11 (C<D). In the example of FIG. 2B, approximately d+C=D. Consequently, the excitation laser beam spot 11 begins the partial irradiation of the next transparent segment as soon as the preceding transparent segment starts to migrate out of the excitation laser beam spot (corresponds in FIG. 2B to the movement of the excitation laser beam spot 11 (in the reference plane of the phosphor carrier 5) to the left). At the same time, constant irradiation of the yellow phosphor with a portion of the cross-sectional area of the excitation laser beam spot 11 which changes as it moves across it also takes place, since the extent L of the phosphor segment 13 transversely to the movement direction M is approximately as great as the diameter D of the excitation laser beam spot 11 and consequently greater than the diameter d of the transparent segments 12. In this embodiment of the segmentation, the first type is ultimately formed by the single entire phosphor segment 13. The second type, specifically the in this case eight circular transparent segments 12, are all arranged within this single phosphor segment 13. What is achieved with this segmentation is that at no point in time during a period is only a single segment irradiated. Rather, always at least two segments, and during seven phases in which the excitation laser beam spot 11 is moved over two transparent segments 12, even three segments are at least partially irradiated simultaneously. Due to this and due to the circular-round configuration of the transparent segments 12, which are smaller than the excitation laser beam spot 11 (d<D) and move, as it were, through the center of the excitation laser beam spot 11, a color inhomogeneity is achieved that is further improved with respect to that from FIG. 2A. In a further embodiment (not illustrated), the transparent segments 12 can also be only approximately circular, e.g. polygonal or in freeform.

Figure 2C:
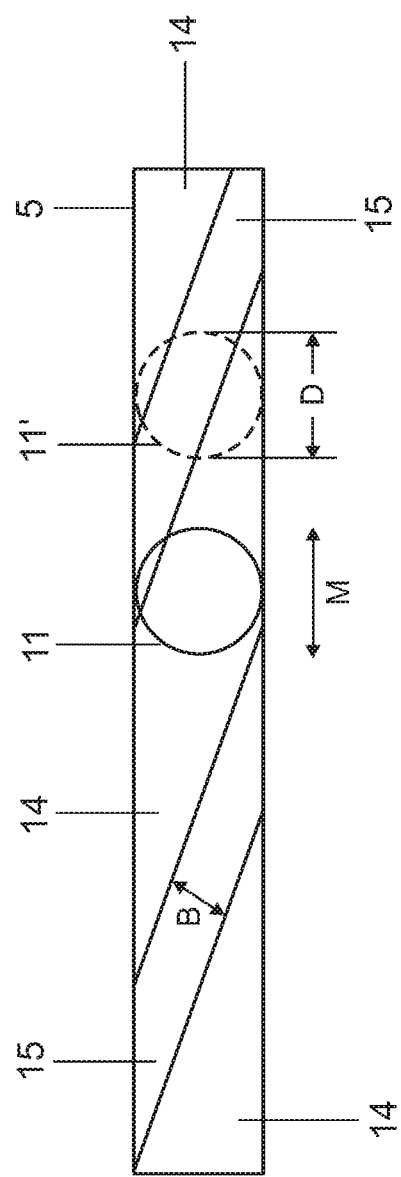
FIG. 2C shows an embodiment of the phosphor carrier shown in FIG. 1 with obliquely oriented transparent segments.

The embodiment of the phosphor carrier 5 illustrated in FIG. 2C differs from the embodiment illustrated in FIG. 2A in that the stripe-type segments 14, 15 of both types, which are arranged in alternation, are aligned at an angle to the movement direction M. Here too the width B of the transparent segments 15 is smaller than the diameter D of the excitation laser beam spot 11. As a result, the transparent segments 15 migrate, as it were, through the larger excitation laser beam spot 11 at an angle. Consequently there are phases also in this case in which three segments are at least partially irradiated simultaneously (see, for example, the dotted excitation laser beam spot 11'). In addition, owing to the orientation of the segments being at an angle to the movement direction M, a gradual, e.g. "soft" transition between immediately neighboring segments is achieved, as a result of which the time-averaged color homogeneity is further improved. The width B of the transparent segments 15 and the inclination angle of the transparent segments 15 with respect to the oscillation direction M can be correspondingly varied or adapted to the technical requirements.

The embodiments of the phosphor carrier 5 illustrated in FIG. 2D and FIG. 2E change the concept illustrated in FIG. 2C in as far as the obliquely oriented transparent stripes are geometrically approximated by discrete segments 15' or 15", which are in each case oriented parallel to the movement direction and all have the same, relatively simple shape. In functional terms, there are at best marginal differences. The effect of the two discretized embodiments may be simpler manufacturing. For example, these same transparent segments 15', 15" can be manufactured later by punching from a previously applied contiguous phosphor layer, e.g. among others using a laser. In a further embodiment (not illustrated), the transparent segments 15' of 15" can in each case be formed differently or variably with respect to their shape, and thus deviate from the exact shape of FIG. 2D and FIG. 2E.

The embodiment of the phosphor carrier 5 illustrated in FIG. 3 has a segmentation in which two sawtooth-shaped types of segments are intermeshed. The segments of both types, phosphor segments 16 and transparent segments 17, in each case have triangular shapes (sawtooth-shaped). The steepness or size of the acute angle in each triangle determines how many segment changes per period take place. It is thereby possible to change the relative proportions of the irradiation of the segments of both types that are time-averaged during one period by way of a displacement N of the relative movement transversely to the movement direction M and thus also the color temperature of the resulting white useful light. A displacement apparatus for setting the position of the excitation laser beam track transversely to the movement direction is not illustrated for the sake of clarity. Illustrated are, by way of example, an instantaneous position of the excitation laser beam spot 11 in one setting with relatively high time-averaged yellow segment proportion (corresponds to a low or "warm" color temperature) and an instantaneous position of the excitation laser beam spot 11" in a setting with a relatively high time-averaged transparent segment proportion, i.e. blue component (corresponds to a high or "cold" color temperature). The color homogeneity at least in the two extreme settings illustrated by way of example is not entirely optimum, since even here phases of irradiation of only one segment occur. However, the effect here may be, among others, that the respectively set time-averaged ratio of yellow component to blue component remains constant relatively well from one period to another over long time periods. This is because this embodiment is relatively insensitive with respect to, for example, mechanics-based fluctuations in the excitation laser beam track, since the setting region for the relative color light components is spread over the length of the segment teeth.

The concepts for a segmentation according to various embodiments illustrated in FIG. 2A to FIG. 2E and FIG. 3 can also be transferred to a rotational movement, for example of a phosphor wheel.

Figure 4:
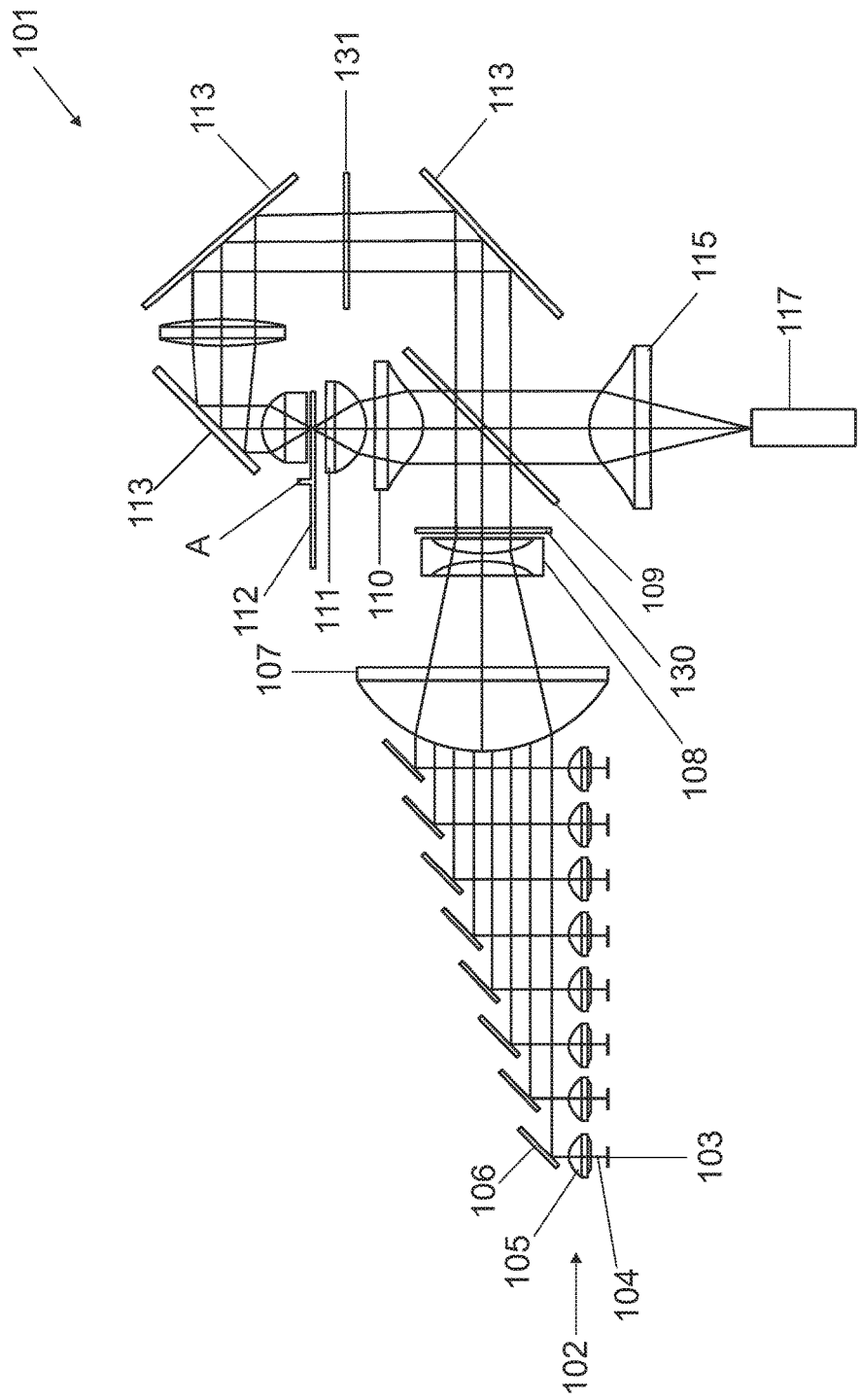
FIG. 4 shows an embodiment of a light module with a phosphor wheel.

A light module 101 with a phosphor wheel provided for reflection operation is schematically illustrated by way of example in FIG. 4. The light module 101 here includes an excitation laser 102, which is configured in the form of a laser diode array and includes a plurality of laser diodes 103. The excitation laser 102 emits excitation laser light here in the blue spectral range, e.g. at approximately 450 nm, since this represents a suitable excitation wavelength for most phosphors and is additionally also utilizable as a blue color light channel. Optical elements 105-111 are used to guide the excitation laser light 104 from these laser diodes 103 onto a phosphor apparatus which is configured in the form of a phosphor wheel 112. The two optical elements 107, 108 form a reducing telescope. Moreover, a diffuser 130 is arranged in the beam path of the optical elements 105-111 in order to generate a broadened intensity profile on the phosphor wheel 112 by way of scattering the excitation laser light 104.

Figure 5A:
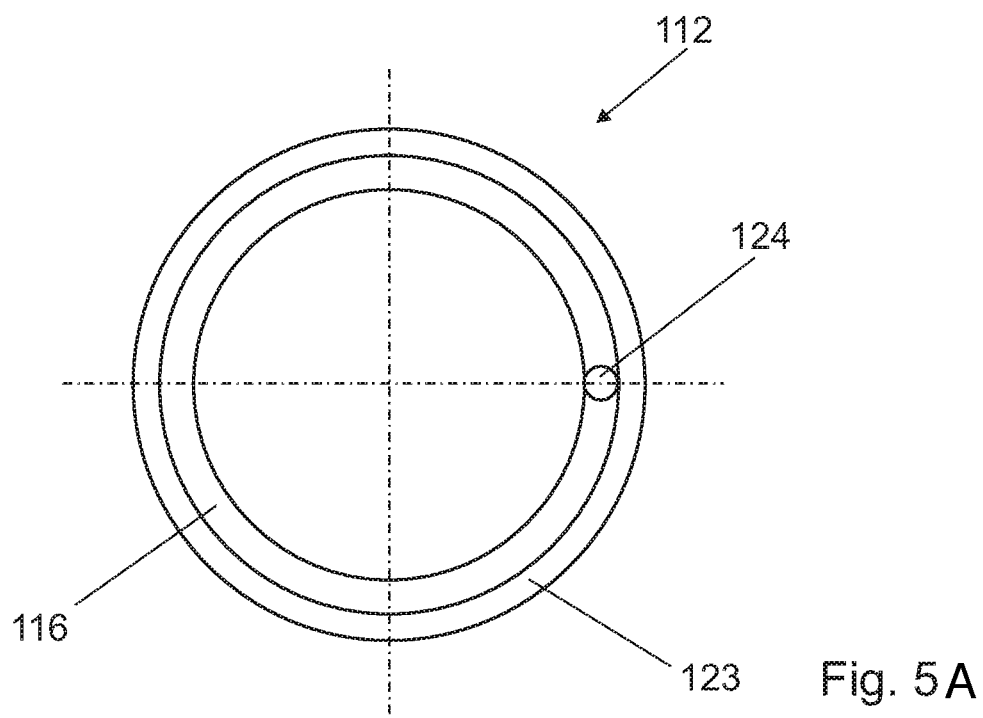
FIG. 5A shows a front view of an embodiment of the phosphor wheel shown in FIG. 4.
Figure 5B:
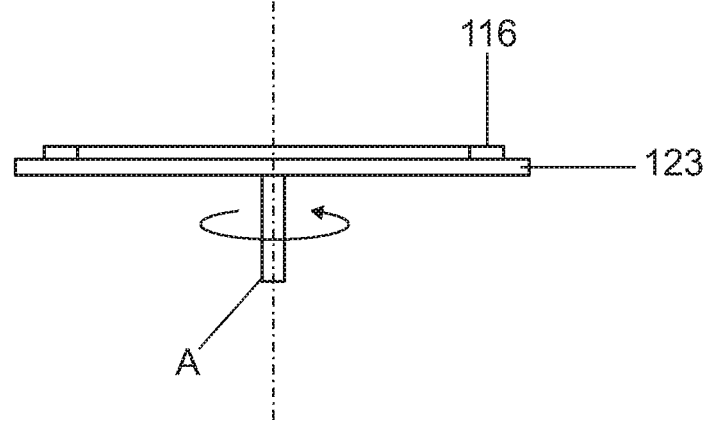
FIG. 5B shows a side view of the phosphor wheel shown in FIG. 5A.

Reference is now also made to FIG. 5A, FIG. 5B, which show the phosphor wheel 112 in a front view and side view. The phosphor wheel 112, which is adapted for the reflection mode, is here configured such that it is rotatable about the rotational axis A and has a region 116 that extends annularly around the rotational axis A. At its core, the segmentation corresponds to one of the embodiments illustrated in FIG. 2A to FIG. 2E and FIG. 3, for example the embodiment illustrated in FIG. 2B, except that it extends in a completely annularly circumferential manner and is not illustrated in detail in FIG. 5A for the sake of simplicity. In addition, only the transparent segments are transmissive, while the phosphor segments are configured to be reflective. Per period, that is to say per complete revolution of the phosphor wheel 112, the excitation laser beam spot 124 completely swipes over the annular region 116 once.

The carrier substrate 123 of the phosphor wheel 112 consists for example of metal, e.g. aluminum, since it can dissipate the heat loss from the phosphor conversion well and has a high reflectance in the visible spectral range. The transparent regions can be configured for example simply as apertures in the carrier substrate 123.

The light that is converted and emitted by the phosphor wheel 112 is collected (see FIG. 4) and collimated by two lenses 111, 110, and then passes through a dichroic mirror 109, which is configured to reflect light in the blue spectral range and to transmit light that is not in the blue spectral range, i.e. light having greater wavelengths. With this design, the dichroic mirror 109 serves for combining the light converted and emitted by the phosphor wheel 112 with the excitation laser light 104 which is transmitted by the respective transparent segments of the phosphor wheel 112.

For deflecting the transmitted excitation laser light 104, three deflection mirrors 113 are provided that are arranged in the beam path in each case at an angle of 45° with respect to the incident excitation laser light 104 ("wrap-around" path of the excitation laser light). A further diffuser 131 is arranged in this wrap-around path.

The for example yellow conversion light and the blue excitation laser light combined by the dichroic mirror 109 now form the white useful light at the output. For example, it passes via a focusing lens 115 into an optical integrator 117 for further use in an illumination apparatus.

Figure 6:
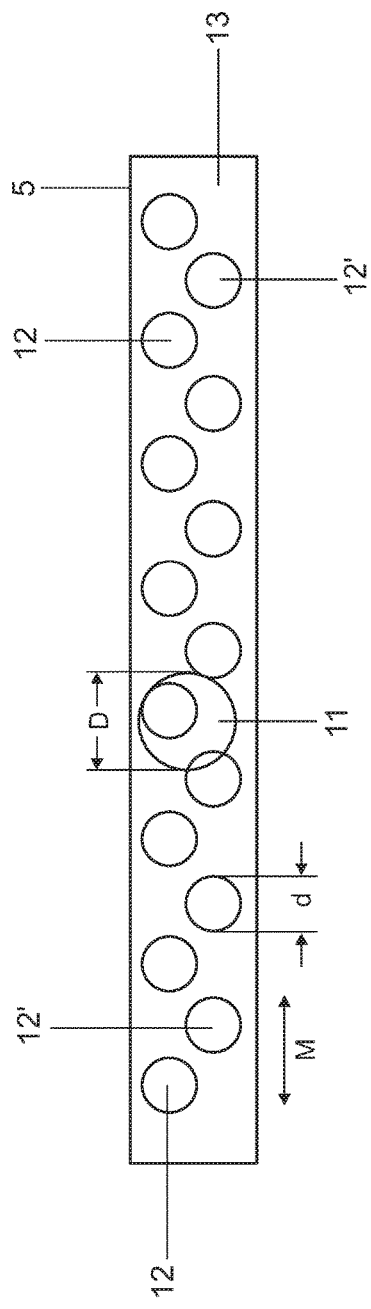
FIG. 6 shows a variant of the embodiment of the phosphor carrier shown in FIG. 2B.
Figure 7:
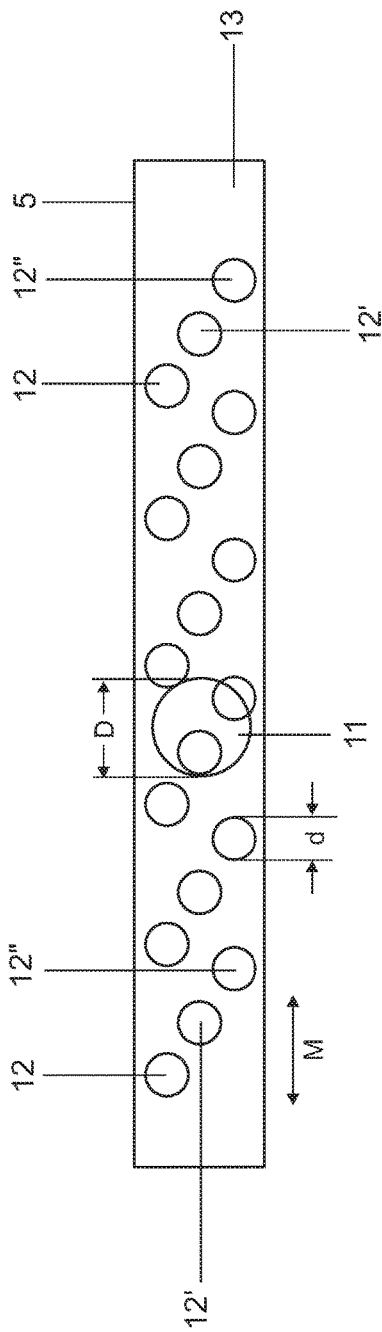
FIG. 7 shows a further variant of the embodiment of the phosphor carrier shown in FIG. 2B.

FIG. 6 and FIG. 7 schematically illustrate two variants of the embodiment of the phosphor carrier 5 shown in FIG. 2B. The essential difference is that in FIG. 6, two rows 12, 12' of circular transparent segments are formed, and in FIG. 7 there are three rows 12, 12', 12". These rows are arranged with a slight offset with respect to one another, with the result that in each case a sequence of pairs or triplets of transparent segments which are oriented obliquely with respect to the movement direction M are formed. To this extent, these two variants can also be viewed as approximations, as it were, of the sequence of oblique transparent stripe segments 15 illustrated in FIG. 2C. The effect with respect thereto may be, among others, that the excitation laser beam spot 11 covers a ratio of transparent segment area to phosphor segment area that is as constant as possible at all times. In addition, the hole segment structure is able to be easily manufactured. The diameter d of the circular transparent segments also decreases with the number of rows of transparent segments 12, 12', 12" as compared to the diameter D of the circular excitation laser beam spot 11. Here, the two variants are dimensioned such that the time-averaged proportion of irradiated phosphor area to irradiated transparent area and consequently the color temperature is in each case identical. In each case, the magnitude of the diameter D and d and the mutual spacing between the transparent segments 12, 12', 12" is dimensioned such that, within a specified region of the relative movement, at least two transparent segments 12, 12' are at least partially irradiated simultaneously in addition to the phosphor segment 13 at every point in time.

Figure 8:
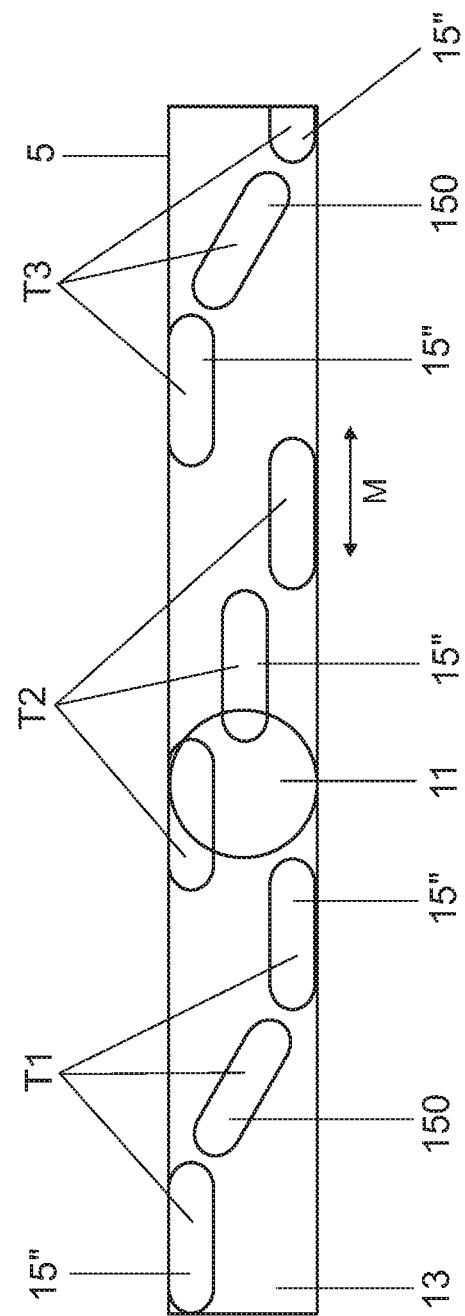
FIG. 8 shows a variant of the embodiment of the phosphor carrier shown in FIG. 2E.

FIG. 8 schematically illustrates a variant of the embodiment of the phosphor carrier 5 shown in FIG. 2E. This variant differs only in that in the case of two successive triplets T1, T2, and T2, T3 of transparent segments 15" of the same type, the in each case central segment has a different orientation, specifically in the triplet T2 parallel (segment 15") to the movement direction M (like the two other segments of the triplet and generally also all segments in FIG. 2E), and in the triplets T1 and T3 obliquely (here approximately 45°) with respect thereto (segments 150). The spatial arrangement of the central segment of the associated triplets is thus in each case different in the case of two successive phases. As a result, an even better spatial mixing of the two color light components of the resulting useful light in the time average is achieved.

Figure 9:
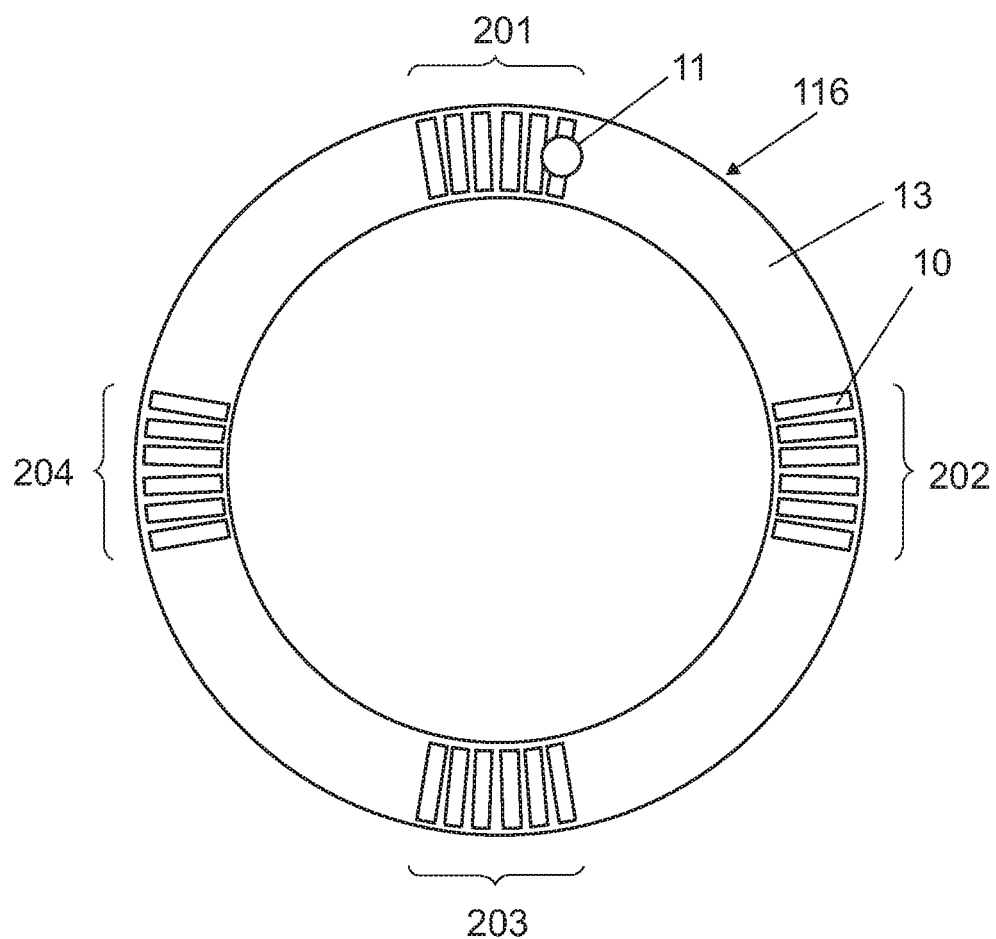
FIG. 9 shows an embodiment of a ring-shaped segmentation structure for a phosphor wheel.

FIG. 9 shows a schematic illustration of an embodiment of a ring-shaped segmentation structure 116 for a phosphor wheel as is illustrated for example in FIG. 5A, FIG. 5B. Here, the transparent segments 10 have a rectangular configuration, similar to the embodiment of the elongate phosphor carriers 5 illustrated in FIG. 2A. However, in this case the transparent segments 10 are not arranged uniformly along the ring-shaped segmentation structure 116, but rather in groups. The four groups 201-204 are arranged with a mutual spacing of approximately 90° on an otherwise contiguous ring-shaped phosphor track 13. Each of the identically designed groups 201-204 in this example has six identical rectangular transparent segments 10, which are arranged at a mutual spacing such that in each case a partial region of the ring-shaped phosphor track 13 is between the transparent segments 10. The width of the transparent segments 10 and their mutual spacing within a group are dimensioned such that both together are smaller than the diameter of the laser spot 11. As a result, at least two transparent segments 10 and the phosphor track 13 are always at least partially irradiated simultaneously within the groups by the laser spot 11, and consequently a good color homogeneity is achieved. A relatively long region with only the phosphor track 13, i.e. which does not have any transparent segments itself, extends between the groups 201-204.

It is possible with the group arrangement to achieve the same white point as in the case of a uniform distribution by way of a suitable division of the number and width of the transparent segments with respect to the phosphor area. Another effect with respect to a uniform distribution is that the color point can also be changed dynamically by way of time-selective irradiation of the segmentation structure 116, i.e. during the operation of the illumination apparatus. It is possible by way of suitable modulation of the excitation laser radiation for various regions of the segmentation structure to be irradiated with different laser output. For example, the laser can be on only when over the transparent segment groups to generate cold white light, or be always constantly on for normal white light. In a further variant, the number and width of the respective transparent segments 10 can be matched suitably to the requirements. By way of example, the number of the individual transparent segments 10 per transparent group 201-204 can be varied, as can the mutual spacing of the respective transparent segments 10. The number of the transparent groups and their mutual angular spacing can also be varied.

Figure 10:
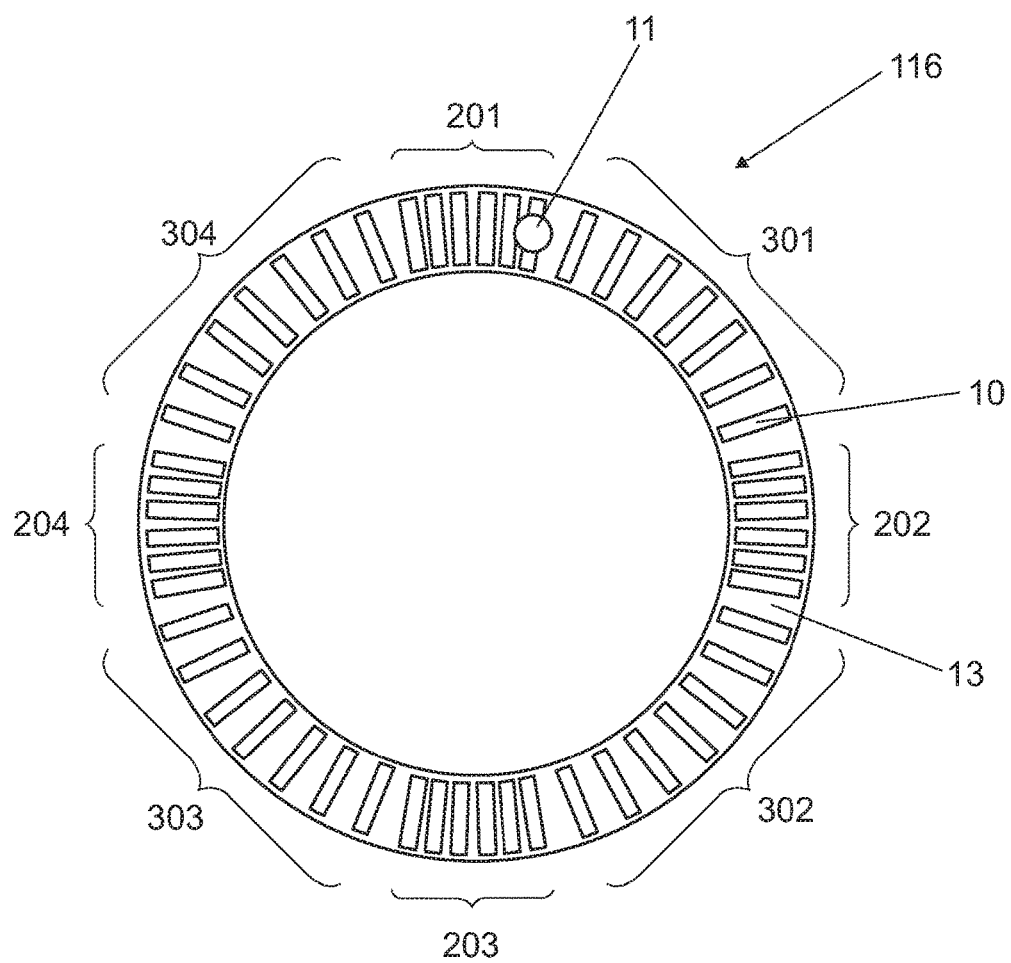
FIG. 10 shows a further embodiment of a ring-shaped segmentation structure for a phosphor wheel.

FIG. 10 shows a schematic illustration of a further embodiment of a ring-shaped segmentation structure for a phosphor wheel. With respect to the embodiment illustrated in FIG. 9, there is arranged in each case between the groups 201-204 having transparent segments that are arranged relatively close together in this case a further group of transparent segments having greater mutual spacings, i.e. four further groups 301-304 in total. Due to the additional groups 301-304 having transparent segments that are arranged widely apart, together with a corresponding laser output modulation, the possibility of further color point setting arises. For example, the laser can be on only when over the transparent segment groups having a wide spacing, or its irradiation power can be increased with respect to a normal output, in order to generate warm white light. If the laser is on only when over the transparent segment groups with close spacing, or if its irradiation output is increased with respect to a normal output, cold white light is generated. Normal white light is finally generated if the laser is always operated at a constant output, and if the ratio of the total area of the irradiated transparent segments to the total area of the irradiated phosphor track or the integral laser output that is incident on the respective area portion per period is suitably selected.

It is to be appreciated that it is also possible to deviate from the concrete specifications of the embodiments without departing from the scope of the inventive teaching. This applies e.g. to the number of segments and groups. Finally, the various segments can in principle also be arranged and/or shaped completely irregularly.

In addition, the embodiments are adapted such that at each point in time at least two segments from different types (i.e. at least one yellow segment and transparent segment) are irradiated. Further segments which are irradiated simultaneously (also of the same types) are thus not excluded. For example, FIG. 2B shows a corresponding embodiment in which at each point in time the yellow segment 13 and at least one transparent segment 12 are at least partially irradiated. There are also phases in which the yellow segment (always) and two transparent segments are irradiated simultaneously (partially). In FIG. 8, at each point in time, for example two transparent segments are also at least partially irradiated simultaneously in addition to the yellow segments.

It is also possible for the illumination apparatus to contain more than one type of phosphor, as a result of which for example a greater capability for setting the white point or the color point of the useful radiation is achieved. It is also possible for the concentration of the phosphor dopants along the illuminated phosphor segments to change, which likewise makes possible a further ability to set the white point or color point. It is likewise possible with a suitable projection optical unit to vary the size of the spot of the laser beam. This offers further degrees of freedom for changing for example a color temperature and/or illuminance. The illumination apparatus according to various embodiments can be used for transmission operation, in which both the phosphor regions and the transparent regions are adapted to be transmissive both for the laser radiation and for the conversion radiation. It is also possible for the conversion regions to be configured to be reflective for laser radiation and conversion radiation, and for the transmission regions to be transmissive for the laser radiation. It is also possible for the conversion regions to be configured to be transmissive and for the other regions to be reflective, by the latter being filled with a material that reflects the laser radiation. As a result, a multiplicity of configurations are possible without departing from the scope of protection of this invention. It is also possible for more than one laser beam to irradiate the phosphor apparatus, specifically at the same and/or different sites of the oscillating or rotating phosphor apparatus. Here, the lasers can emit the same or different excitation wavelengths.

LIST OF REFERENCE SIGNS 1 light module
2 excitation laser
3 excitation laser light
4 focusing optical unit
5 phosphor carrier
6 conversion light
7 collimation optical unit
8 white mixed light (useful light)
9 phosphor segment
10 transparent segment (rectangular)
11 excitation laser beam spot
12 transparent segment (circular)
13 phosphor segment (one-piece)
14 phosphor segment (obliquely oriented)
15 transparent segment (obliquely oriented)
16 phosphor segment (sawtooth)
17 transparent segment (sawtooth)
11' excitation laser beam spot
12', 12" transparent segment
15', 15" transparent segment
101 light module
102 excitation laser
103 laser diodes
104 excitation laser light
105-111 optical elements
107, 108 telescope lenses
109 dichroic mirror
112 phosphor wheel
113 deflection mirror
116 ring-shaped region with segmentation
117 optical integrator
123 carrier substrate
124 excitation laser beam spot
130, 131 optical diffuser
150 transparent segment
201 group 1 close transparent segments
202 group 2 close transparent segments
203 group 3 close transparent segments
204 group 4 close transparent segments
301 group 1 wide transparent segments
302 group 2 wide transparent segments
303 group 3 wide transparent segments
304 group 4 wide transparent segments
M movement direction
N displacement
D diameter of the excitation laser beam spot
d diameter of the circular transparent segments
T1, T2, T3 triplets of transparent segments While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A light module for providing light, comprising:
   an excitation radiation source which is adapted to emit excitation radiation;
   at least one first phosphor which is adapted to at least partially convert the incident excitation radiation into conversion light and to generate with this conversion light a first light path;
   a phosphor apparatus having a segmentation which has at least two different types of segments, with the segments of the first type comprising the first phosphor;
   wherein the light module is designed for a periodic movement between an excitation beam that is coming from the excitation radiation source and is incident on the phosphor apparatus and the segmentation, in which there is at least one phase per period in which more than two segments are at least partially irradiated simultaneously by the excitation radiation.

2. The light module of claim 1,
   wherein, during the at least one phase, at least two of the segments which are at least partially irradiated simultaneously by the excitation radiation belong to the same type of segments.

3. The light module of claim 1,
   wherein the segmentation is configured such that, during one period, there are at least two phases in which a spatial arrangement of the segments, which are at least partially irradiated simultaneously by the excitation radiation, differs.

4. The light module of claim 1,
   wherein at least the second type comprises segments that transmit or reflect the excitation radiation without conversion, and wherein the light module is adapted to generate a second light path with the unconverted excitation radiation that is coming from these segments.

5. The light module of claim 1, further comprising:
   an optical system, which is adapted to combine the first and the second light path.

6. The light module of claim 1,
   wherein the segmentation is configured such that the segments of the second type are arranged within one or more segments of the first type, or vice versa.

7. The light module of claim 6,
   wherein at least one of the types has only one segment.

8. The light module of claim 1,
   wherein the excitation beam and the segmentation are configured such that the diameter of the excitation beam on the segmentation is of identical size or greater than a dimension of the segments of at least one type in the movement direction or perpendicular thereto.

9. The light module of claim 8,
   wherein the diameter of the excitation beam on the segmentation is greater than a dimension of the segments of all types both in the movement direction and perpendicular thereto.

10. The light module of claim 1,
    wherein the phosphor apparatus is configured as a phosphor wheel which is adapted for a rotation about a rotational axis, and wherein the segmentation is configured in a ring shape or ring-segment shape.

11. The light module of claim 1,
    wherein the excitation beam and the segmentation are configured such that the color point of the resulting light can be changed by way of a relative displacement between excitation beam and segmentation perpendicular to the movement direction.

12. The light module of claim 1,
    wherein the phosphor apparatus is configured as an elongated phosphor carrier
    wherein the periodic movement is a lateral oscillation.

13. The light module of claim 1,
    wherein the phosphor apparatus comprises a second type of segment that is transparent.

14. A method for operating a light module,
    the light module comprising:
    an excitation radiation source which is adapted to emit excitation radiation;
    at least one first phosphor which is adapted to at least partially convert the incident excitation radiation into conversion light and to generate with this conversion light a first light path;
    a phosphor apparatus having a segmentation which has at least two different types of segments, with the segments of the first type comprising the first phosphor;
    wherein the light module is designed for a periodic movement between an excitation beam that is coming from the excitation radiation source and is incident on the phosphor apparatus and the segmentation, in which there is at least one phase per period in which more than two segments are at least partially irradiated simultaneously by the excitation radiation;
    the method comprising:
    simultaneously irradiating three or more segments, at least temporarily, at least in partial regions by the excitation radiation.

15. The method of claim 14,
    wherein at least one of a spatial arrangement or type association of the simultaneously irradiated segments is changed in a temporal sequence.

16. The method of claim 14,
    wherein at no point in time are only segments of the same type irradiated.

* * * * *